United States Patent [19]

Tanaka

[11] 4,318,592
[45] Mar. 9, 1982

[54] LENS SYSTEM WITH ATTACHMENT LENS REMOVABLY ATTACHED

[75] Inventor: Kazuo Tanaka, Tokyo, Japan

[73] Assignee: Canon Kabushiki Kaisha, Tokyo, Japan

[21] Appl. No.: 28,442

[22] Filed: Apr. 9, 1979

[30] Foreign Application Priority Data

Apr. 13, 1978 [JP] Japan ................................ 53-43565
Apr. 17, 1978 [JP] Japan ................................ 53-45102

[51] Int. Cl.³ ............................................. G02B 15/02
[52] U.S. Cl. ....................................... 350/427; 350/422
[58] Field of Search ................................ 350/422, 427

[56] References Cited

U.S. PATENT DOCUMENTS

| | | | |
|---|---|---|---|
| 3,507,555 | 4/1970 | Isshiki | 350/427 |
| 3,970,367 | 7/1976 | Tsuji | 350/427 |
| 4,146,305 | 3/1979 | Tanaka | 350/422 |
| 4,157,211 | 6/1979 | Tanaka et al. | 350/422 |

*Primary Examiner*—John K. Corbin
*Assistant Examiner*—Scott J. Sugarman
*Attorney, Agent, or Firm*—Toren, McGeady & Stanger

[57] ABSTRACT

In the rear of a zoom part consisting of a variator and a compensator, preceded by a focusing lens group, is a relay lens consisting of a front lens group and a rear lens group separated by an air space in which an attachment lens is removably positioned. This attachment lens is of positive power and has a primary principal plane which is dimensioned upon attachment to lie on the object side of a secondary principal plane of the zoom part. In one embodiment, the attachment lens is constructed in the form of a Galilean telescopic system which may include a meniscus lens convex toward the front.

7 Claims, 93 Drawing Figures

SPHERICAL ABERRATION   ASTIGMATISM   DISTORTION

TRANSVERSE ABERRATION

TRANSVERSE ABERRATION

TRANSVERSE ABERRATION

FIG.7A  FIG.7B  FIG.7C
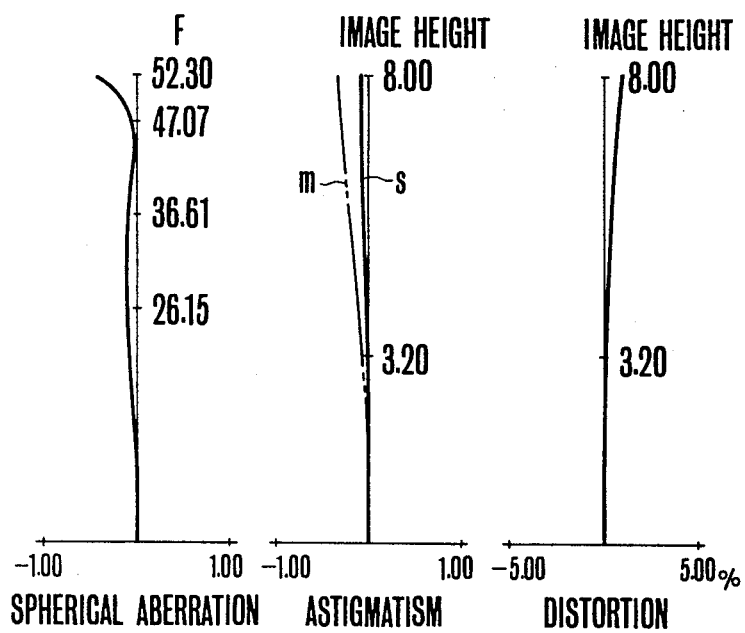
SPHERICAL ABERRATION   ASTIGMATISM   DISTORTION
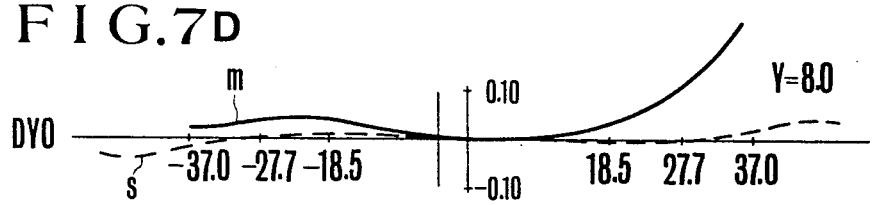
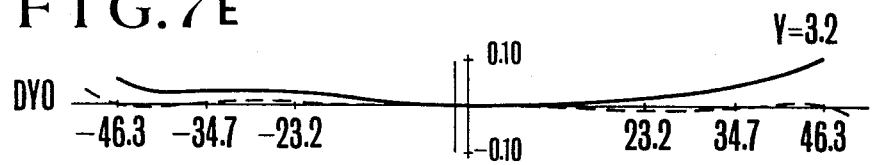
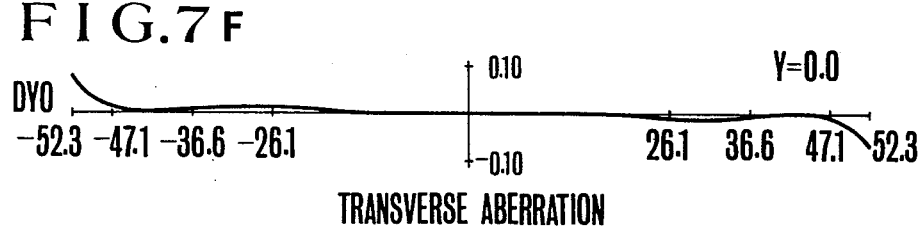
TRANSVERSE ABERRATION

TRANSVERSE ABERRATION

FIG.10A  FIG.10B  FIG.10C
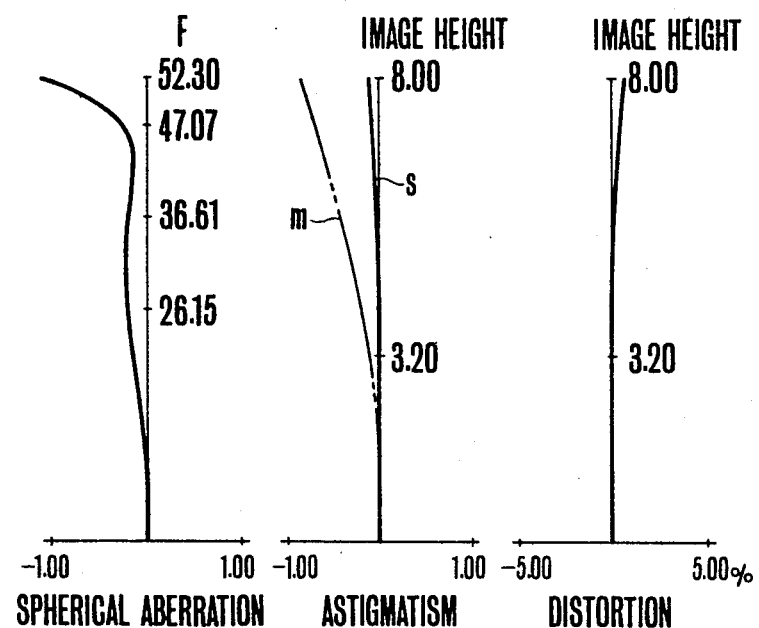
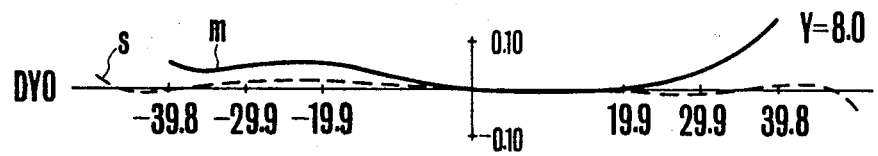
FIG.10D
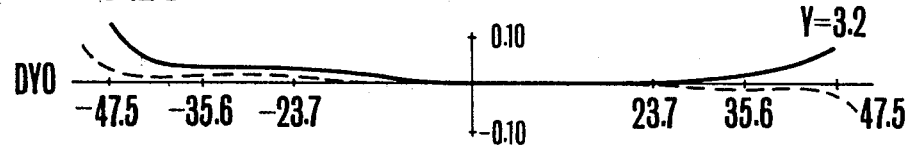
FIG.10E
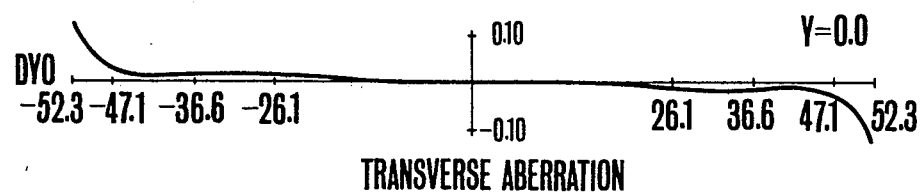
FIG.10F
TRANSVERSE ABERRATION

SPHERICAL ABERRATION   ASTIGMATISM   DISTORTION

TRANSVERSE ABERRATION

SPHERICAL ABERRATION  ASTIGMATISM  DISTORTION

TRANSVERSE ABERRATION

SPHERICAL ABERRATION    ASTIGMATISM    DISTORTION

TRANSVERSE ABERRATION

SPHERICAL ABERRATION   ASTIGMATISM   DISTORTION

TRANSVERSE ABERRATION

SPHERICAL ABERRATION  ASTIGMATISM  DISTORTION

TRANSVERSE ABERRATION

TRANSVERSE ABERRATION

SPHERICAL ABERRATION | ASTIGMATISM | DISTORTION

TRANSVERSE ABERRATION

TRANSVERSE ABERRATION

LENS SYSTEM WITH ATTACHMENT LENS REMOVABLY ATTACHED

BACKGROUND OF THE INVENTION

This invention relates to an objective lens system having an attachment lens inserted thereto, or removed therefrom to change the focal length of the system while maintaining a fixed image plane, and, more particularly, to improvements in the zoom lens system with its relay lens having an air space in which the attachment lens is positioned.

To change the focal length of a fixed-focal-length lens, or to shift the focal length range of a zoom lens, there have been known various methods such as those of removably attaching an additional lens from the outside at an air space between the rear vertex of the lens system and the focal plane, of substituting a portion of the objective lens, in the case of the zoom lens, the relay lens for another one, of removably attaching an afocal length whose angular magnification is not the unity of plus and minus sign to the basic objective at the front thereof, and of constructing the relay lens of the zoom objective in the zoom lens form.

In application of such methods to the lens systems of large diameter and heavy weight such as for use in television cameras, however, the operation of detaching the objective from the camera body followed by reassembling them along with the additional lens is very time-consuming and tedious. In the case of the front attachment of afocal nature, it is further required to increase the diameter of the attachment with the resulting price being boosted. The last-named method requires to increase the necessary number of lens element in the zoom type relay lens. Thus, disadvantages are given such that the physical length of the lens system is increased and that the price is raised.

The present applicant has proposed an objective lens system in U.S. Pat. No. 4,015,895 where the relay lens of the zoom objective is divided into two parts in such a way that an afocal light path is established therebetween. By inserting or removing an afocal lens into or from this optical path, the focal length range is shifted while the back focal length is maintained unchanged. Another proposal has been made in U.S. Patent Application Ser. No. 692,518, now U.S. Pat. No. 4,240,697, where a portion of the relay lens is interchanged with another.

It is, however, found that the latter requires an operating mechanism of severer accuracy than does the former, and the structure of the mechanism is also complicated. As far as the mechanical aspect is concerned, the former is preferred to the latter. Even in the former, however, the special creation of an air space where the optical path becomes afocal in the relay lens leads to enhance the difficulty of lens design. On this account, the applicant of the present invention has attempted to impart a negative power into a magnification converting lens adapted upon attachment in the relay lens to shift the focal length range towards longer values in U.S. Patent Application Ser. No. 777,852, now U.S. Pat. No. 4,157,211. Thus, the degree of freedom in the lens design for aberrational correction and power distribution is increased.

There would be no problem for the negative attachment lens provided that the basic objective is of the type where the Petzval sum does not result in a large negative value when the attachment lens is inserted. In an objective lens system which tends to have a negative value of the Petzval sum as is general in the zoom lenses, the use of the negative attachment lens contributes to an increase in the value of the Petzval sum in the negative sense. Thus, the deterioration of the image quality due to the field curvature is intensified.

SUMMARY OF THE INVENTION

An object of the present invention is to prevent deterioration of field curvature from occurring when the attachment lens is inserted.

Another object of the invention is to shorten the attachment lens in the axial direction while the various aberrations are maintained well corrected.

Still another object of the invention is to increase the rate of magnification by the attachment lens.

To achieve these objects, as applied to an objective lens system comprising a first lens group counting from the front, a second lens group with its front principal point disposed on the rear side of the rear principal point of the first lens group, and a third lens group separated from the second lens group by a fixed air space into or from which an attachment lens is inserted or removed, the refractive power of the attachment lens is made positive, and the front principal point of the attachment lens inserted is ahead of the rear principal point of the second lens group.

In one embodiment, the first lens group includes a front lens member axially movable for focusing and a plurality of lens members axially movable for zooming, and the front and rear parts of the relay lens which are both positive are included in the second and third lens groups respectively. The attachment lens is constructed from a plurality of lens elements in the form of a Galilean telescopic system upon insertion in between the second and third lens groups to shift the zooming range towards longer focal lengths while still maintaining a fixed image plane. It is to be noted that, in this specification, the term "front" is equivalent to the object side when the system is aligned to an object, and the term "rear" is equivalent to the image side.

BRIEF DESCRIPTION OF THE DRAWINGS

FIGS. 7A to 7F are similar graphs when set at the tele end.

FIGS. 10A to 10F are similar graphs when set at the tele end.

DESCRIPTION OF THE PREFERRED EMBODIMENTS

Figure 1A:
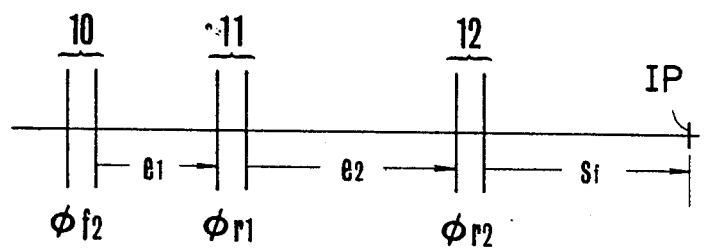
FIG. 1A is a diagram showing a predesign of a thin lens system without the attachment lens.
Figure 1B:
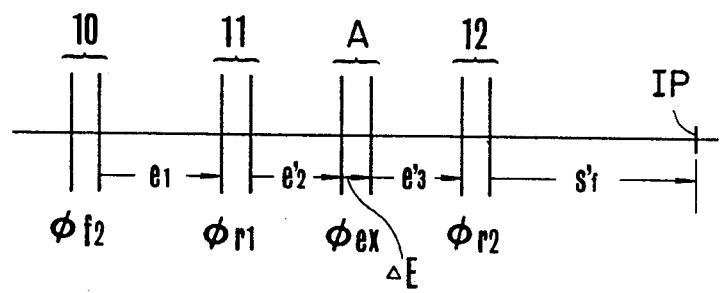
FIG. 1B is a similar diagram with the attachment lens inserted.

FIG. 1A shows a state before the attachment lens is inserted, and FIG. 1B shows a state after it is inserted.

10 is the primary and secondary principal planes of a composite part of a focusing member and zoom members of a zoom lens. It is noted that the focusing member is focused for an object at infinity, and the zoom members may be positioned to effect a desired focal length. The composite power is denoted by $\phi fz$.

11 is the primary and secondary principal planes of the front group of the relay lens of the zoom lens. It is noted that a lens for converting a beam of light rays emerging from the zoom members to an afocal light beam may be occasionally included in this group. $\phi r1$ denotes the power of the front group of the relay lens. 12 is the primary and secondary principal planes of the rear group of the relay lens, and $\phi r2$ denotes its power. IP is an image plane at which a film surface, or an image receiving surface of an image pick-up tube is arranged. e1 denotes the interval between the secondary principal plane of the composite part 10 and the primary principal plane of the front group of the relay lens, e2 the interval between the secondary principal plane of the front group of the relay lens and the primary principal plane of the rear lens group of the relay lens, and Sf the interval between the secondary principal plane of the rear lens group of the relay lens and the image plane IP, where $e1>0$, and $e2>0$.

In the following formulae, [ ] is a Gaussian bracket known and referred to in Journal of Optical Society of America, 651-655 pp.33 No.12 (1944) by Herzberger. At first, the focal length, f, of the entire system may be expressed as:

$$f = \frac{1}{[\phi fz, -e1, \phi r1, -e2, \phi r2]} \quad (1)$$

Also the back focal length Sf may be expressed as:

$$Sf = [\phi fz, -e1, \phi r1, -e2]f \quad (2)$$

Next, A in FIG. 1B is the primary and secondary principal planes of the attachment lens, its power being denoted by $\phi ex$, and the principal plane interval by $\Delta E$. e1 is the interval between the secondary principal plane of the composite part 10 and the primary principal plane of the front group 11 of the relay lens, e'2 the interval between the secondary principal plane of the front group of the relay lens and the primary principal plane of the attachment lens A, e'3 the interval between the secondary principal plane of the attachment lens 14 and the primary principal plane of the rear group 12 of the relay lens, and Sf' the interval between the secondary principal plane of the rear group of the relay lens and the image plane IP.

At this time, the focal length, f', of the entire system is as follows:

$$f' = \frac{1}{[\phi fz, -e1, \phi r1, -e'2, \phi ex, -e'3, \phi r2]} \quad (3)$$

Also the back focal length is as follows:

$$Sf' = [\phi fz, -e1, \phi r2, -e'2, \phi ex, -e'3]f' \quad (4)$$

Here, the conditions occurring when the attachment lens is attached, the focal length becomes m times the value of the focal length with no attachment lens used, when the position of the image plane is not displaced, and when the total length is not altered, are as follows:

For m times the magnification of the focal length $$f' = mf \quad (5)$$

for no change of the back focal length $$Sf = Sf' \quad (6)$$

for no change of the length of the entire system $$e'2 + \Delta E + e'3 = e2 \quad (7)$$

By rearranging the above formulae (1) to (7) and solving the resultant ternary linear equation for e'2, e'3 and $\phi ex$, we have $$e'2 = e2 - \Delta E - \frac{\alpha}{\alpha \phi r2 - \beta}$$

$$e'3 = \frac{\alpha}{\alpha \phi r2 - \beta}$$

$$\phi ex = \frac{\alpha}{[\phi fz, -e1, \phi r1, -e'2][-e'3]fm}$$

$$= \frac{\beta}{[\phi fz, -e1, \phi r1, -e'2][-e'3, \phi r2]fm}$$

where $$\alpha = Sf - [\phi fz, -e1, \phi r1, (\Delta E - e2)]fm$$

$$\beta = 1 - [\phi fz, -e1, \phi r1, (\Delta E - e2)\phi r2]fm$$

In other words, when an attachment lens of power $\phi ex$ and principal plane interval $\Delta E$ is inserted into such position that the interval between the secondary principal plane of the front group of the relay lens and the primary principal plane of this lens is e'2, and the interval between the secondary principal plane of the attachment lens and the primary principal plane of the rear group of the relay lens is e'3, it is made possible to increase the focal length m times while maintaining the back focal length unchanged.

Then, if a negative value is selected for e'2, and the primary principal plane of the attachment lens is ahead of the secondary principal plane of the front group of the relay lens, it becomes possible to give a positive power to $\phi ex$ while nevertheless establishing the entire system. And, if the attachment lens has a positive power, it becomes possible to prevent deterioration of the Petzval sum representing the field curvature characteristics.

It is to be noted here that if the m value is selected to be less than unity, the focal length is shifted toward shorter focal lengths, and if larger than unity, it is shifted toward longer focal lengths. When the system for shift toward the shorter focal length is employed, as the aberrational problem becomes severer in the shorter focal length position, the attachment lens must be taken into account in designing the basic objective. From the standpoint of reestablishing an equivalent lens performance when the attachment lens is used in the routine way, it is preferred to shift the focal length toward longer ones.

In order to insure that the primary principal plane of the attachment lens is arranged in front of the secondary principal plane of the front group of the image forming lens, one method is to construct the attachment lens in the form of a Galilean telescopic system comprising, from front to rear, positive and negative lens groups.

For better understanding of an improvement of the Petzval sum, reference is had to a numerical example of an embodiment of the invention to be described later in detail. Even in the state where the magnification converting attachment lens is not yet coupled, the minimization of the size of the entire system is aimed at, and therefore, the Petzval sum is −0.066. Exceeding this value in the negative sense is not desirable.

After the attachment lens is coupled, the focal length is increased 1.6 and 2.5 times. On the other hand, since the maximum area of the format is maintained unchanged, the image angle becomes 1/1.6 and 1/2.5 respectively. Therefore, to prevent deterioration of the field curvature, it is required that the absolute value of the Petzval sum be less than $(1.6)^2$ and $(2.5)^2$ times.

The Petzval sum of the 1.6x system as merely calculated will be −0.170. Also, the Petzval sum of the 2.5× system will be −0.416 as merely calculated. On the other hand, the Petzval sum, as the attachment lens (data of which are shown in Table 2) is attached to the zoom lens of Table 1, will be calculated as −0.057. Also, the Petzval sum, as the attachment lens of Table 3 is attached to the zoom lens of Table 1 will be calculated as 0.311. Thus, in both cases the latter Petzval sum has an absolute value smaller than that of the Petzval sum as merely calculated. Therefore, it will be understood that the above prerequisites are satisfied.

Figure 5:
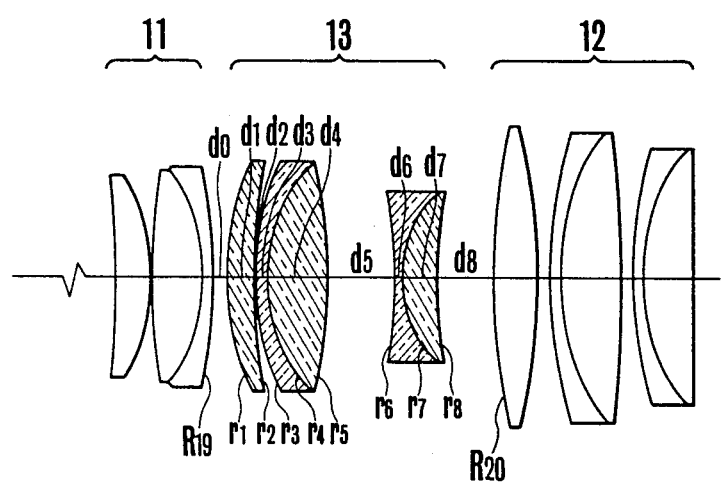
FIG. 5 is a sectional view of an attachment lens of Table 2.
Figures 6A, 6B, 6C:
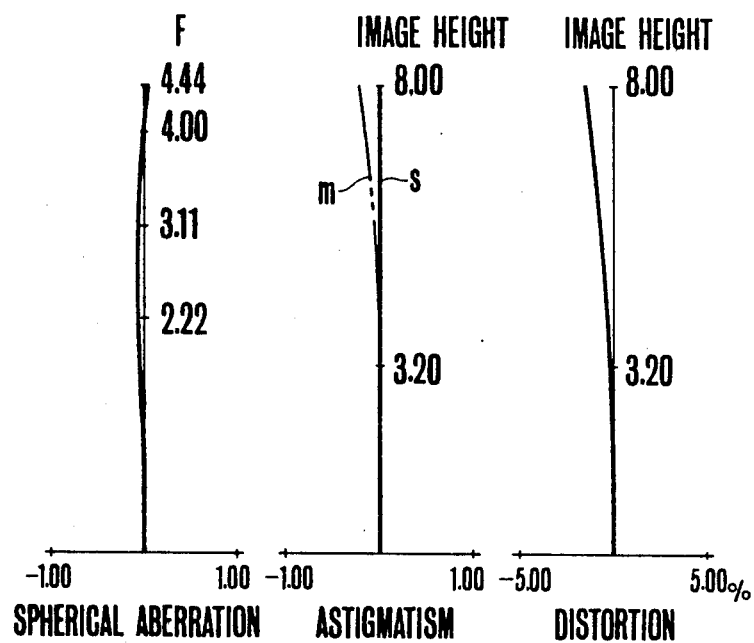
FIGS. 6A to 6F are graphs showing the various aberrations of the zoom lens of FIG. 2 with the attachment lens of FIG. 5 inserted therein when set at the wide angle end.
Figure 6D:
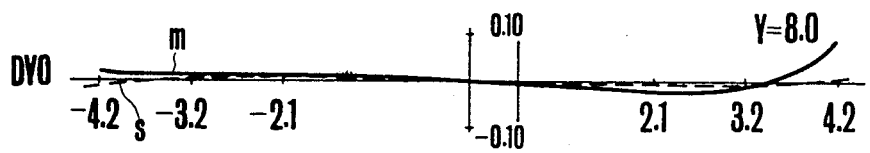
Figure 6E:
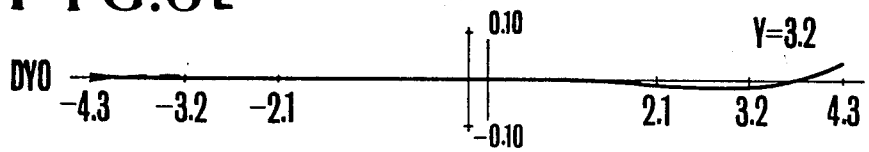
Figure 6F:
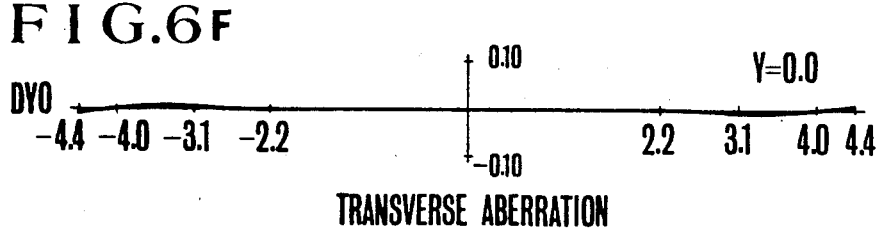
Figure 8:
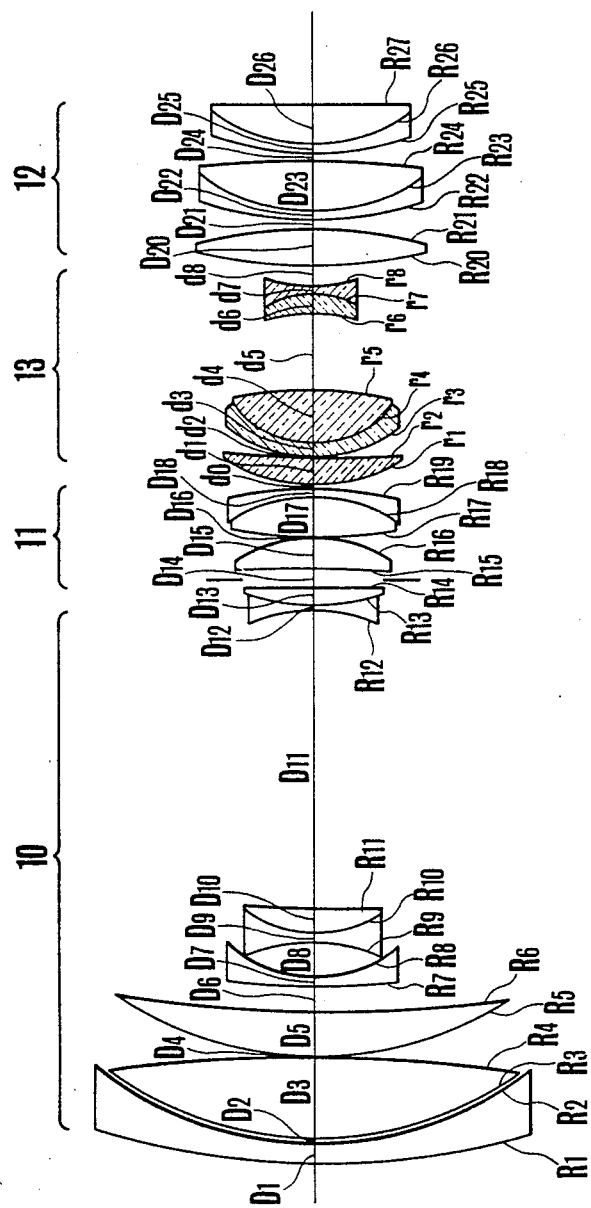
FIG. 8 is a sectional view of a zoom lens with an attachment lens of Table 3 inserted therein.
Figures 9A, 9B, 9C:
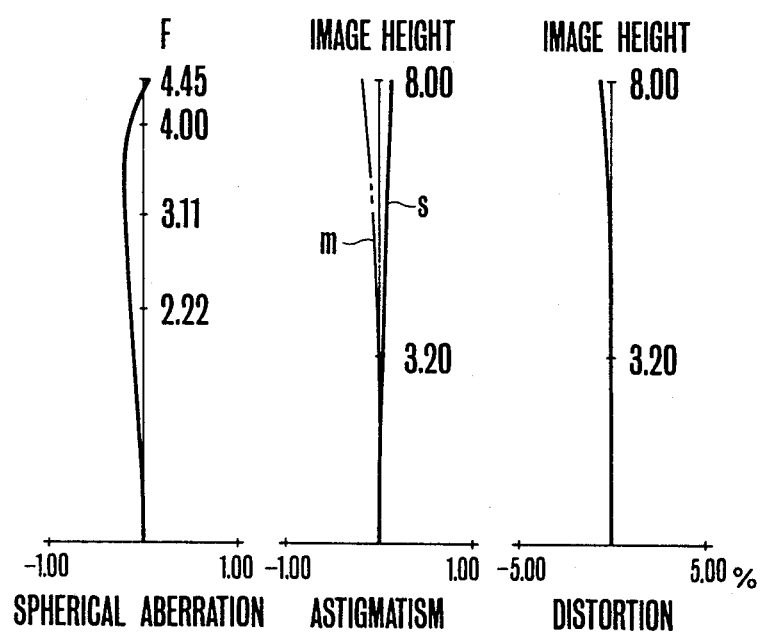
FIGS. 9A to 9F are graphs showing the various aberrations of the lens system of FIG. 8 when set at the wide angle end.
Figure 9D:
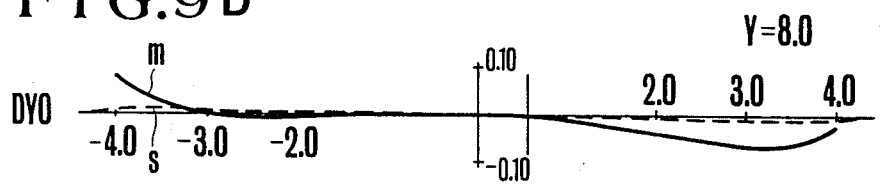
Figure 9E:
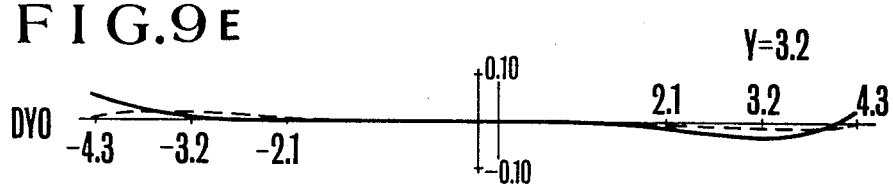
Figure 9F:
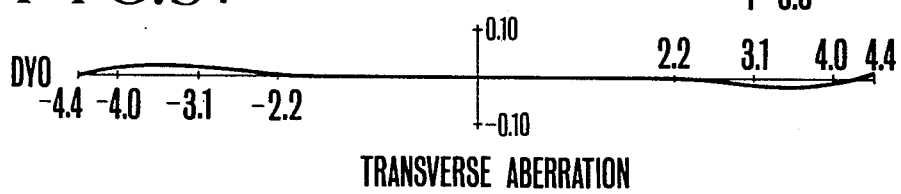
Figure 17:
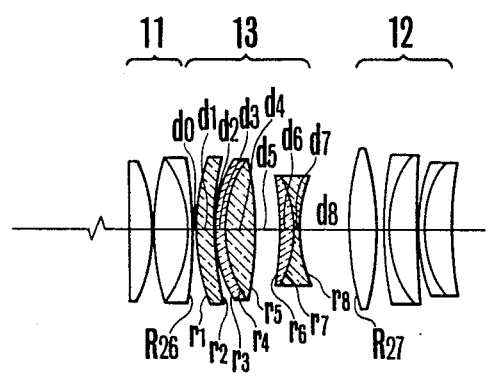
FIG. 17 is a sectional view of an attachment lens of Table 10.

In FIGS. 5, 8 and 17, the attachment lens is constructed from a positive meniscus lens convex toward the front, a bi-convex lens, and a bi-concave lens. This positive meniscus lens bears a portion of the power to be borne by the bi-convex lens. Thus, it contributes not only to a reduction of spherical aberration and off-axial coma produced by the rear surface of the bi-convex lens, but also to a reduction of the chromatic difference in the spherical aberration by the bi-convex lens. On the other hand, it is desirable that the bi-convex lens and the bi-concave lens are achromatic lenses.

Figure 11:
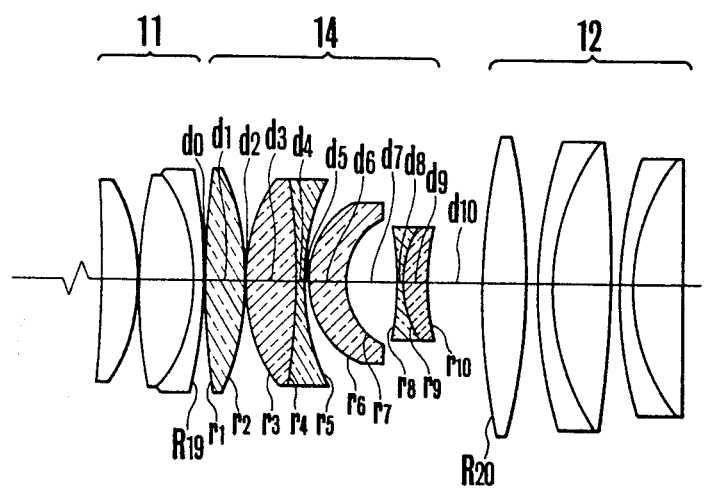
FIG. 11 is a sectional view of an attachment lens of Table 7.
Figures 12A, 12B, 12C:
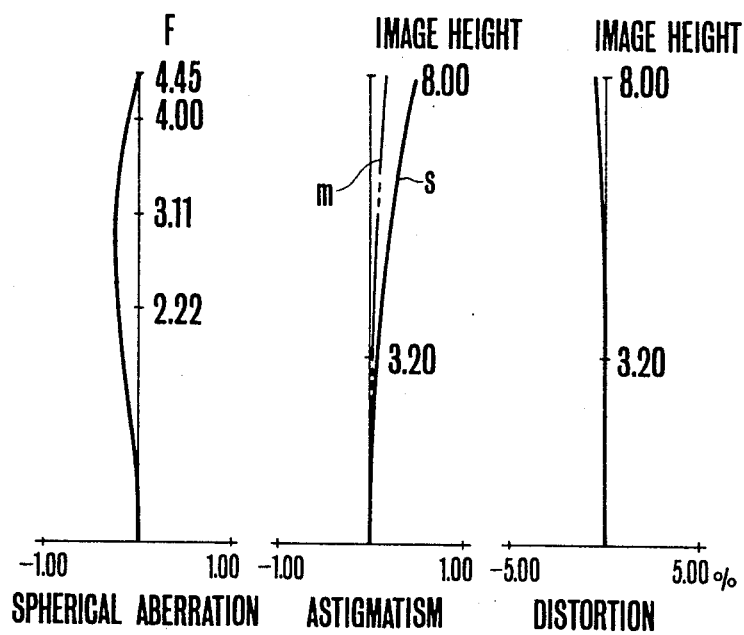
FIGS. 12A to 12F are graphs showing the various aberrations of a zoom lens with the attachment lens of FIG. 11 inserted therein.
Figure 12D:
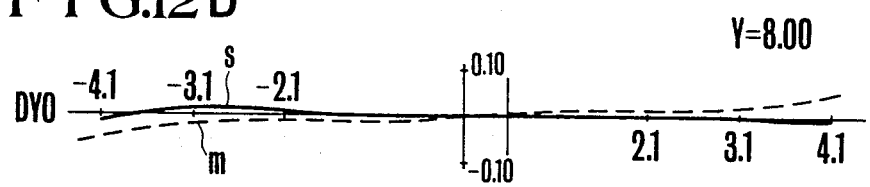
Figure 12E:
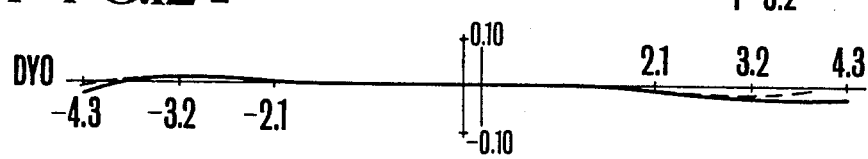
Figure 12F:
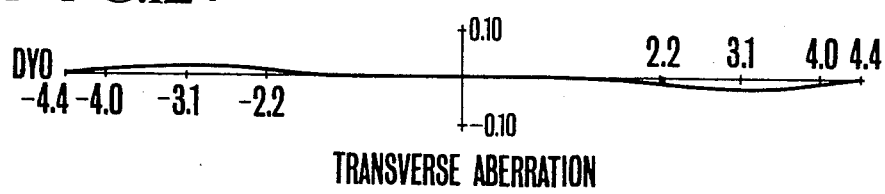
Figures 13A, 13B, 13C:
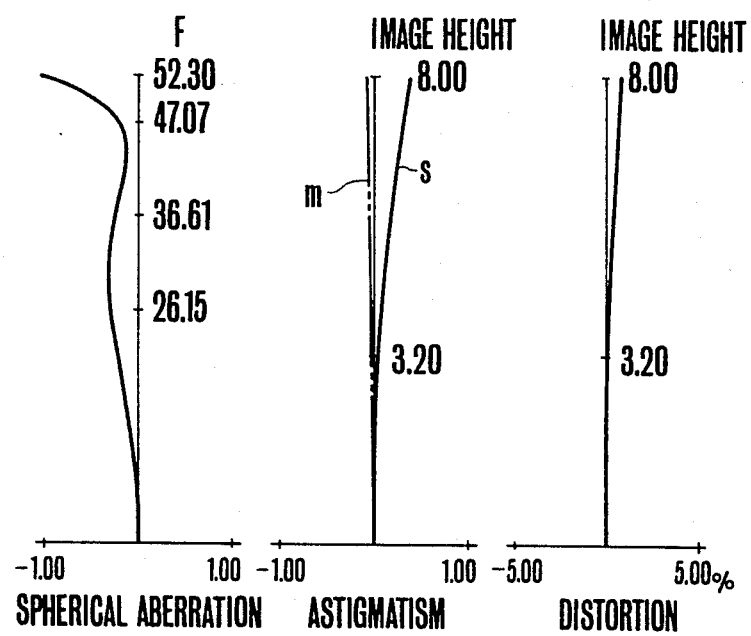
FIGS. 13A to 13F are similar graphs when set at the tele end.
Figure 13D:
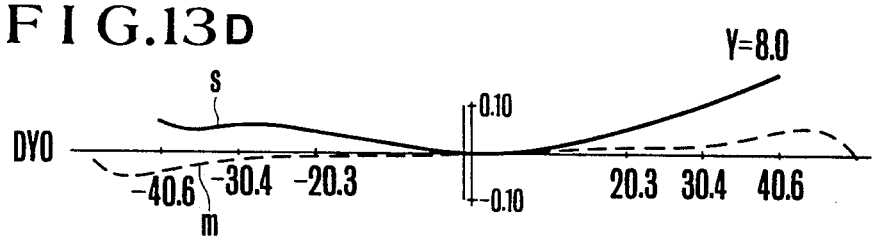
Figure 13E:
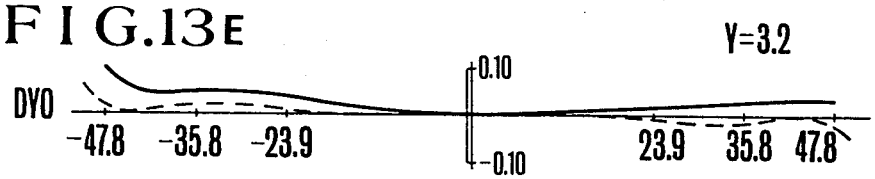
Figure 13F:
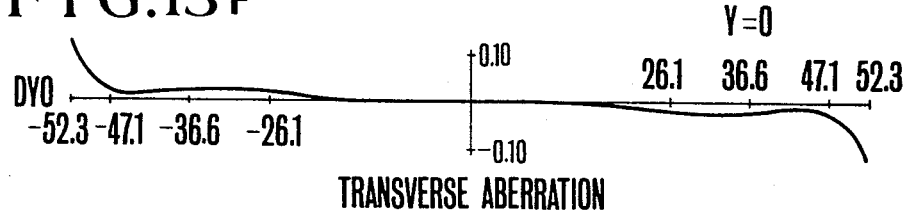
Figure 20:
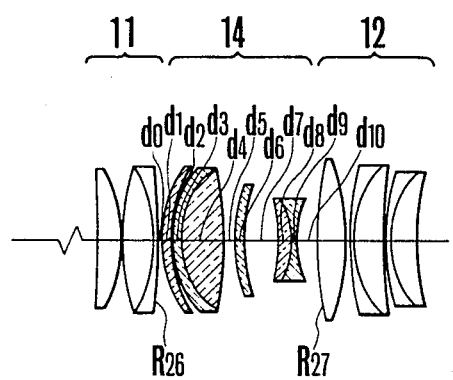
FIG. 20 is a sectional view of an attachment lens of Table 13.
Figures 18A, 18B, 18C:
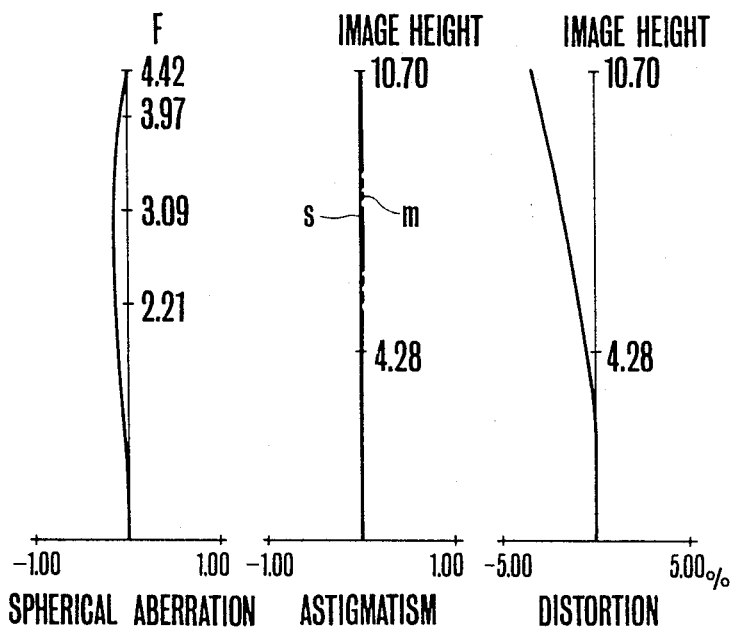
FIGS. 18A to 18F are graphs showing the various aberrations of a zoom lens with the attachment lens of FIG. 17 when set at the wide angle end.
Figure 18D:
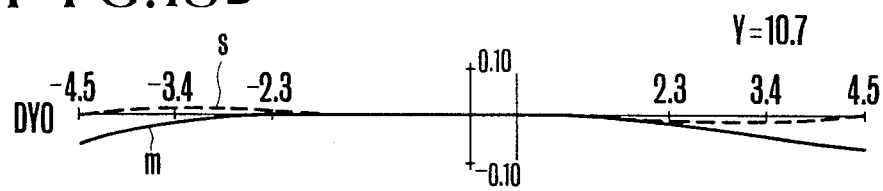
Figure 18E:
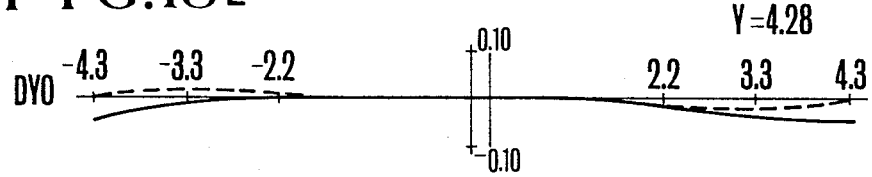
Figure 18F:
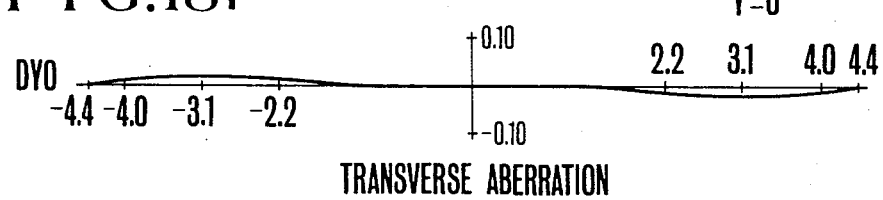
Figures 19A, 19B, 19C:
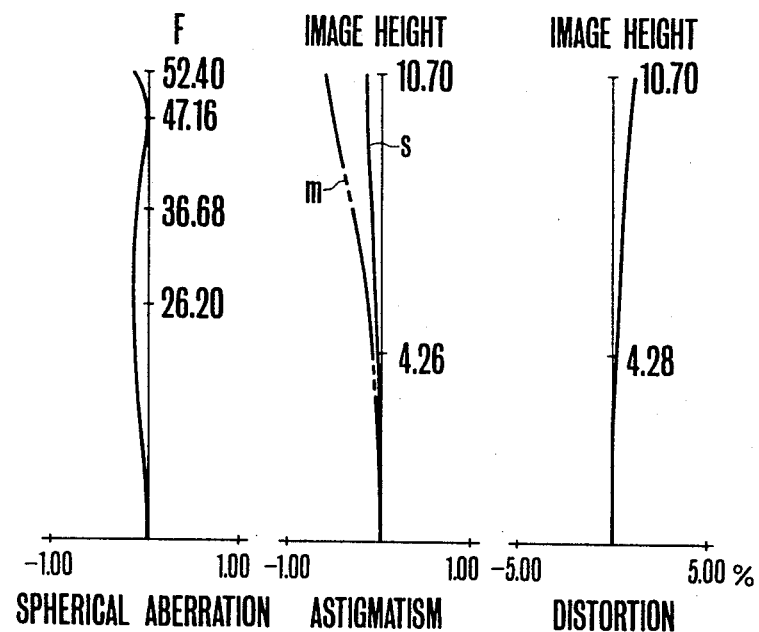
FIGS. 19A to 19F are similar graphs when set in the tele end.
Figure 19D:
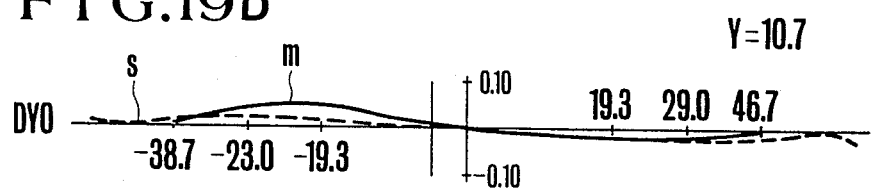
Figure 19E:
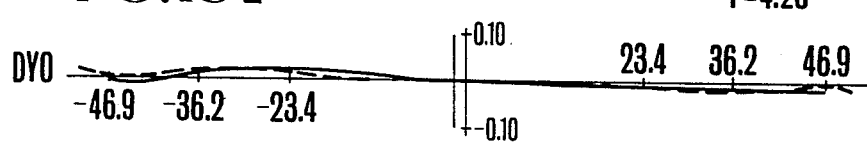
Figure 19F:
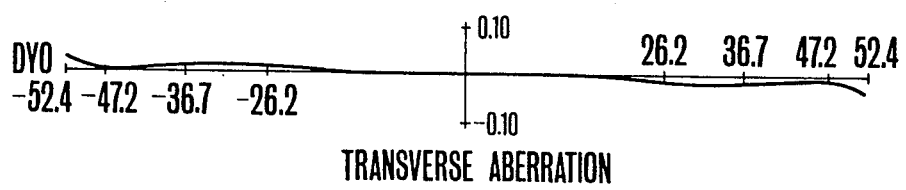
Figures 21A, 21B, 21C:
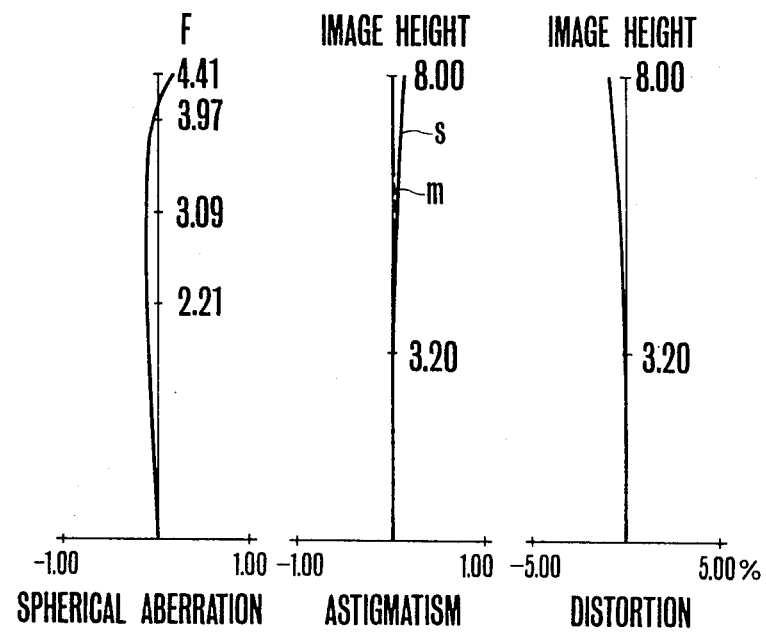
FIGS. 21A to 21F are graphs showing the various aberrations of a zoom lens with the attachment lens of FIG. 20 when set in the wide angle end.
Figure 21D:
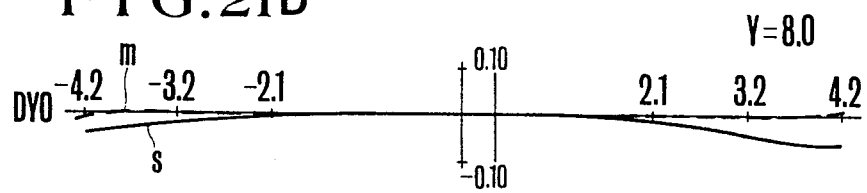
Figure 21E:
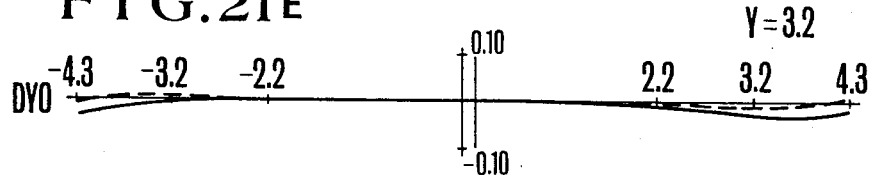
Figure 21F:
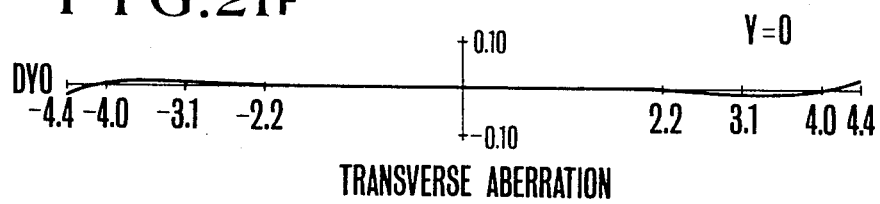
Figures 22A, 22B, 22C:
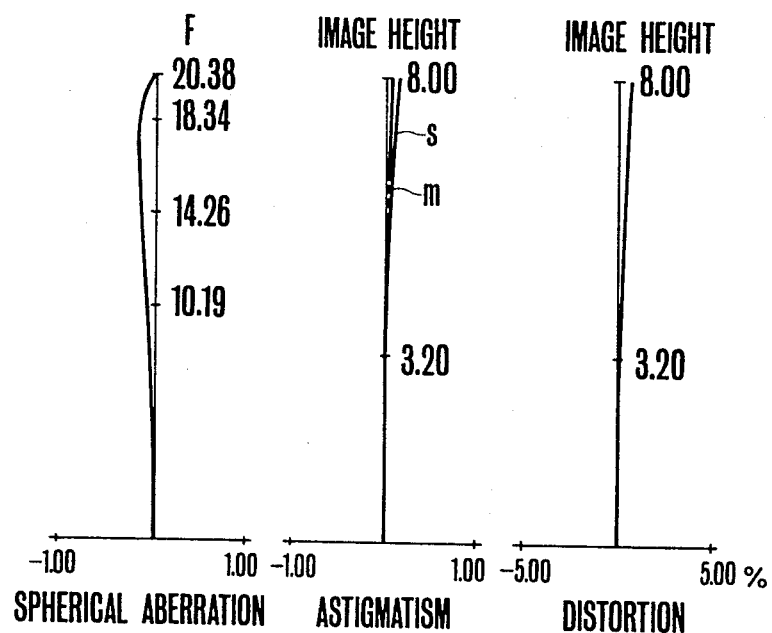
FIGS. 22A to 22F are similar graphs when set in the tele end.
Figure 22D:
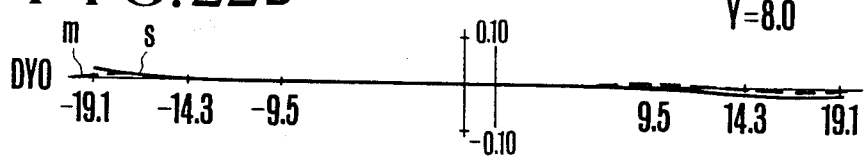
Figure 22E:
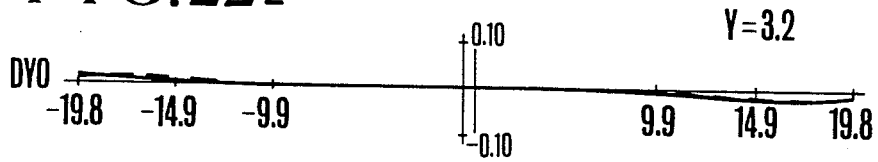
Figure 22F:
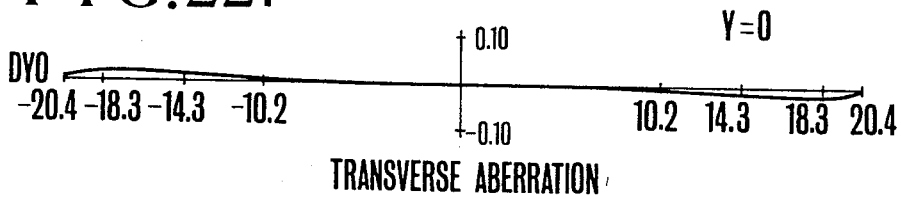

The attachment lens shown in FIGS. 11 and 20 comprises, from front to rear, first and second lens group which are both of positive power, a third group of negative power, and a fourth of negative power. The power of the third group may be positive. The second group mainly contributes to the positive power of a Galilean telescopic lens system, and the fourth group mainly contributes to the negative power of one. The first group has a function to correct spherical aberration, off-axial coma, and chromatic difference of spherical aberration. And the second and fourth groups are made to be individually cemented lenses for the correction of chromatic correction.

A particularly important point is the use of a meniscus lens convex toward the front as the third group. This plays a role in achieving either a minimization of the bulk and size, or an increase of magnification of the attachment lens. In other words, as the attachment lens is a Galilean telescopic system which may be considered as comprising two groups of positive and negative powers, the routine design work for shortening the length of the attachment lens is to strengthen the powers of the positive and negative groups with decrease in the interval therebetween. As the power is strengthened, however, the radii of curvature of the individual lens surfaces become smaller. Thus, this is disadvantageous so far as the aberrational correction is concerned.

According to the present invention, therefore, the intermediate arrangement of a meniscus lens is employed to achieve a minimization of the physical length without causing deterioration of the aberrations. This is because the meniscus lens serves with its front surface as a positive lens, and with its rear surface as a negative lens. Therefore, it is made possible to disperse a portion of each of the powers of the positive and negative lens groups into the meniscus lens. Thus, this gives rise to an advantage that the power of each of the both groups can be strengthened in effect without the necessity of increasing the curvatures of the individual surfaces.

In the following, numerical examples are described. Numerical Example 1 is a zoom lens of a zoom ratio of 10 for a 1-inch image pick up tube. The focal length range is f=15-150. This lens is provided with attachment lenses for conversion of the magnification to 1.6 and 2.5 times. Numerical Example 2 is a 10.5× zoom lens for 1¼-inch image pick up tube. The focal length range is 19-200, and an attachment lens for 1.5 times magnification is provided for.

EXAMPLE 1

Figure 2:
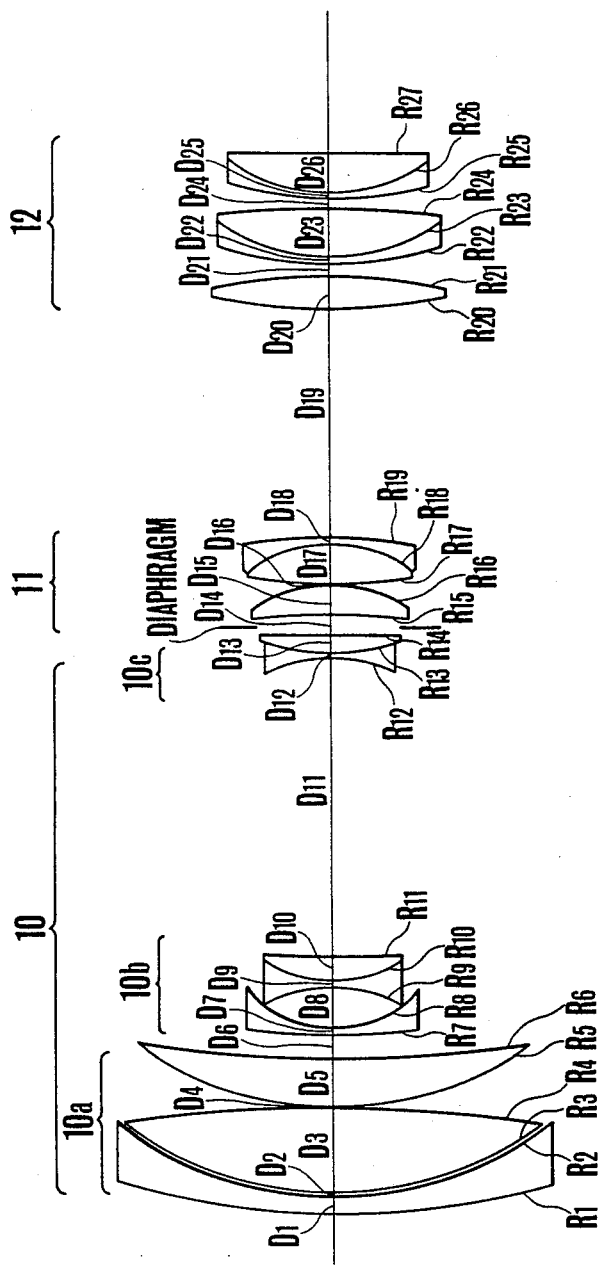
FIG. 2 is a sectional view of a zoom lens of Table 1.
Figures 3A, 3B, 3C:
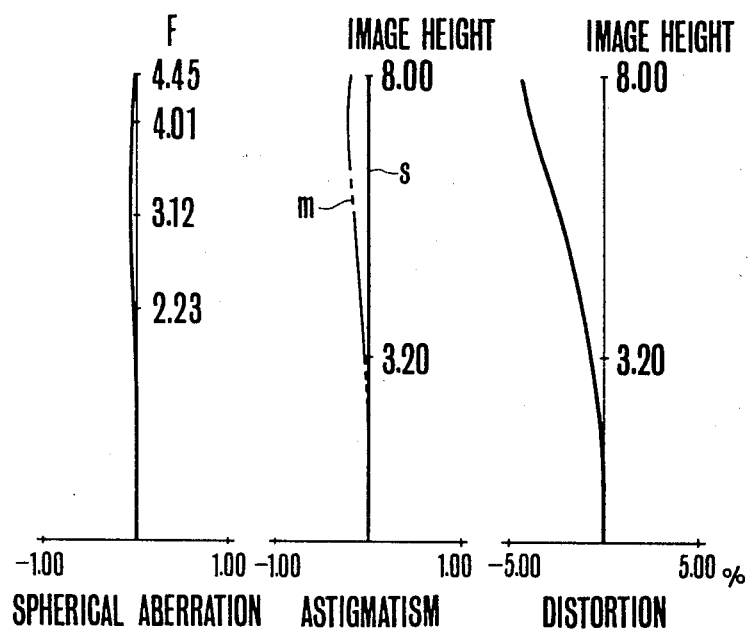
FIGS. 3A to 3F are graphs showing the various aberrations of the zoom lens of FIG. 2 when set at the wide angle end.
Figure 3D:
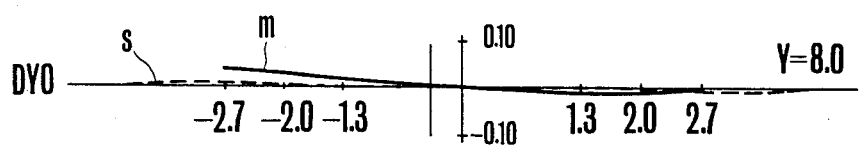
Figure 3E:
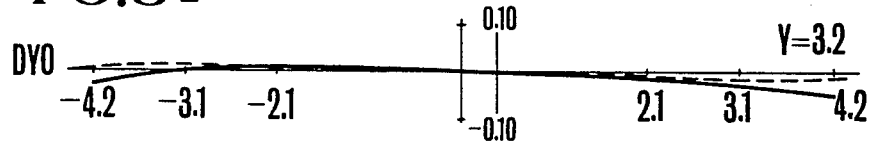
Figure 3F:
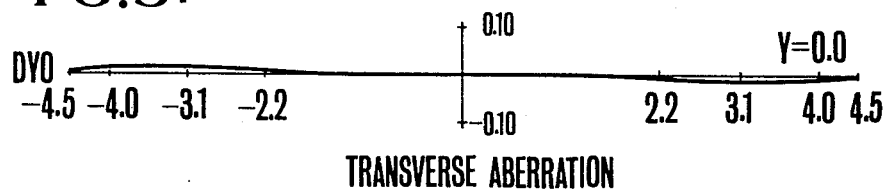
Figures 4A, 4B, 4C:
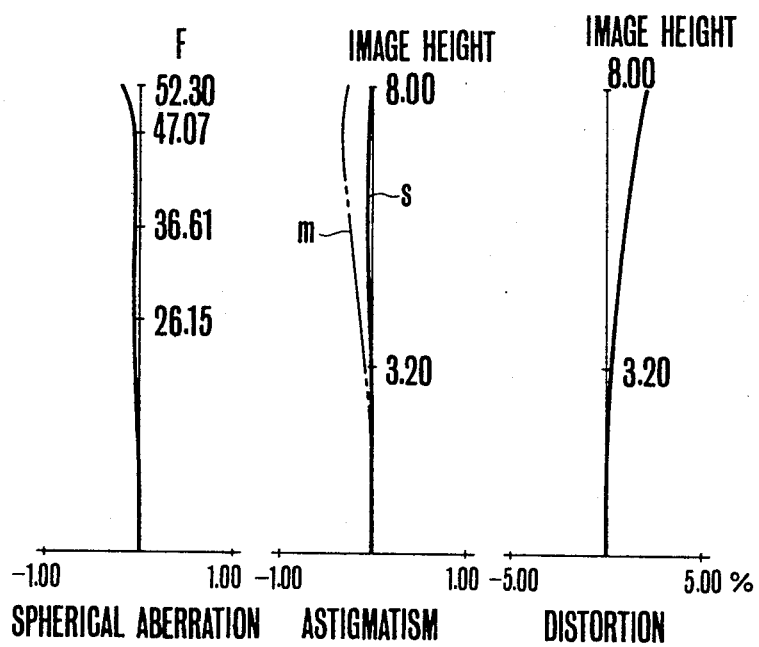
FIGS. 4A to 4F are similar graphs when set at the tele end.
Figure 4D:
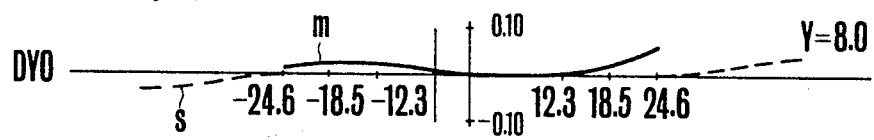
Figure 4E:
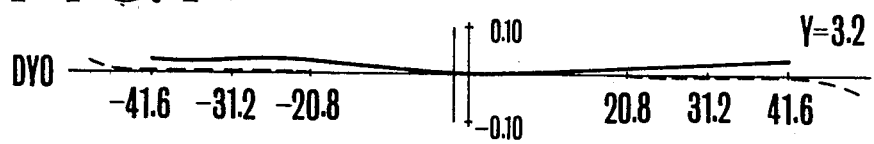
Figure 4F:
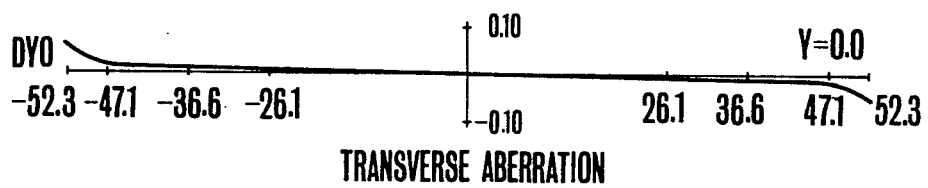

The corresponding lens is shown in FIG. 2, and the various aberrations are shown in FIGS. 3A-3F for the wide angle setting and in FIGS. 4A-4F for the telephoto setting. In the Figure, 10a is a focusing member; 10b is a variator; and 10c is a compensator.

TABLE 1

| Surface No. | R | D | Nd | νd |
| --- | --- | --- | --- | --- |
| 1 | 172.36 | 4.0 | 1.80518 | 25.4 |
| 2 | 77.73 | 1.2 | | |
| 3 | 78.879 | 17.0 | 1.60311 | 60.7 |
| 4 | −350.23 | 0.2 | | |
| 5 | 74.783 | 10.25 | 1.60311 | 60.7 |
| 6 | 280.66 | $D_6$ | | |
| 7 | 138.98 | 1.5 | 1.71300 | 53.9 |
| 8 | 25.29 | 8.42 | | |

TABLE 1-continued

| | | | | |
|---|---|---|---|---|
| 9 | −35.701 | 1.50 | 1.71300 | 53.9 |
| 10 | 27.166 | 5.0 | 1.80518 | 25.4 |
| 11 | 235.35 | $D_{11}$ | | |
| 12 | −38.579 | 1.25 | 1.77250 | 49.6 |
| 13 | 50.59 | 4.0 | 1.80518 | 25.4 |
| 14 | −1267.41 | $D_{14}$ | | |
| 15 | −273.23 | 6.28 | 1.51118 | 51.0 |
| 16 | −33.315 | 0.3 | | |
| 17 | 117.91 | 8.86 | 1.48749 | 70.1 |
| 18 | −29.991 | 1.4 | 1.80610 | 40.9 |
| 19 | −97.225 | 47.32 | | |
| 20 | 114.74 | 7.7 | 1.48749 | 70.1 |
| 21 | −104.96 | 2.0 | | |
| 22 | 80.589 | 1.8 | 1.78590 | 44.2 |
| 23 | 41.325 | 10.35 | 1.51633 | 64.1 |
| 24 | −230.46 | 1.79 | | |
| 25 | 73.398 | 1.6 | 1.75520 | 27.5 |
| 26 | 33.878 | 8.84 | 1.51118 | 51.0 |
| 27 | 4453.80 | | | |

| | $D_6$ | $D_{11}$ | $D_{14}$ |
|---|---|---|---|
| Wide Angle | 0.8281 | 63.25296 | 4.0 |
| Telephoto | 60.5778 | 3.4880 | 4.5152 |

1.6× attachment lens corresponding to FIG. 5.

TABLE 2

| Surface No. | r | d | Nd | νd |
|---|---|---|---|---|
| 0 | | 2.3 | | |
| 1 | 43.932 | 4.58 | 1.51633 | 64.10 |
| 2 | 97.225 | 0.4 | | |
| 3 | 45.616 | 1.8 | 1.75520 | 27.5 |
| 4 | 27.965 | 10.4 | 1.48749 | 70.1 |
| 5 | −72.643 | 11.46 | | |
| 6 | −70.898 | 1.2 | 1.77250 | 49.6 |
| 7 | 20.758 | 5.96 | 1.68893 | 31.1 |
| 8 | 82.334 | 9.12 | | |

When this 1.6× attachment lens is used, the resultant various aberrations are shown in FIGS. 6A-6F for the wide angle setting and in FIGS. 7A-7F for the telephoto setting. 2.5× attachment lens corresponding to FIG. 8.

TABLE 3

| Surface No. | r | d | Nd | νd |
|---|---|---|---|---|
| 0 | | 1.0 | | |
| 1 | 40.476 | 5.48 | 1.48749 | 70.1 |
| 2 | 180.71 | 0.5 | | |
| 3 | 32.978 | 2.2 | 1.80518 | 25.4 |
| 4 | 22.197 | 11.31 | 1.48749 | 70.1 |
| 5 | −92.276 | 16.44 | | |
| 6 | −41.996 | 4.8 | 1.72825 | 28.5 |
| 7 | −15.133 | 1.2 | 1.77250 | 49.6 |
| 8 | 39.691 | 4.39 | | |

When this 2.5× attachment lens is used, the resultant various aberrations are shown in FIGS. 9A-9F for the wide angle setting and in FIGS. 10A-10F for the telephoto setting.

The thin lens separations in the predesign of the numerical Example 1 along with the focal length and back focal length are as follows:

TABLE 4

| Lens Group | 1/φ | e |
|---|---|---|
| 10 | −11.649043 | 34.269373 |
| 11 | 64.124456 | 61.291966 |
| 12 | 60.310191 | |
| | f = 15.207767 | |
| | Sf = 82.664317 | |

With the 1.6× attachment lens:

TABLE 5

| Lens Group | 1/φ | e' |
|---|---|---|
| 10 | −11.649043 | 34.269373 |
| 11 | 64.124456 | −85.603217 |
| 13 | 195.586002 | 98.412868 |
| 12 | 60.310191 | |
| | f' = 24.894361 | m = 1.6369 |
| | Sf' = 82.659736 | ΔE = 48.48231 |

With the 2.5× attachment lens:

TABLE 6

| Lens Group | 1/φ | e' |
|---|---|---|
| 10 | −11.649043 | 34.269373 |
| 11 | 64.124456 | −103.2318 |
| 13 | 98.54039 | 79.0309 |
| 12 | 60.31019 | |
| | f' = 37.431974 | m = 2.4592 |
| | Sf' = 82.667443 | ΔE = 83.90577 |

Next, an example where with the magnification remaining at 2.5 times, the entire length is shortened about 15% without causing deterioration of the various aberrations.

A 2.5× attachment lens corresponding to FIG. 11:

TABLE 7

| Surface No. | r | d | Nd | νd |
|---|---|---|---|---|
| 0 | | 0.80 | | |
| 1 | 194.760 | 6.31 | 1.62041 | 60.30 |
| 2 | −51.823 | 0.30 | | |
| 3 | 29.473 | 8.29 | 1.62041 | 60.30 |
| 4 | −145.280 | 1.40 | 1.80518 | 25.40 |
| 5 | 41.081 | 1.10 | | |
| 6 | 15.479 | 6.23 | 1.80400 | 46.60 |
| 7 | 11.662 | 8.92 | | |
| 8 | −50.870 | 0.80 | 1.77250 | 49.60 |
| 9 | 15.720 | 4.08 | 1.75520 | 27.50 |
| 10 | 55.266 | 9.09 | | |

When this 2.5× attachment lens is used, the various aberrations in the wide angle setting become as shown in FIGS. 12A-12F, and the various aberrations in the telephoto setting become as shown in FIGS. 13A-13F. Also the thin lens separations in the predesign are as follows:

TABLE 8

| Lens Group | 1/φ | e |
|---|---|---|
| 10 | −11.649043 | 34.269373 |
| 11 | 64.124456 | −104.236189 |
| 14 | 96.918150 | 81.622389 |
| 12 | 60.310191 | |
| | f' = 37.599319 | |
| | Sf' = 82.671422 | |
| | m = 2.4592 | |
| | ΔE = 83.90577 | |

EXAMPLE 2

Figure 14:
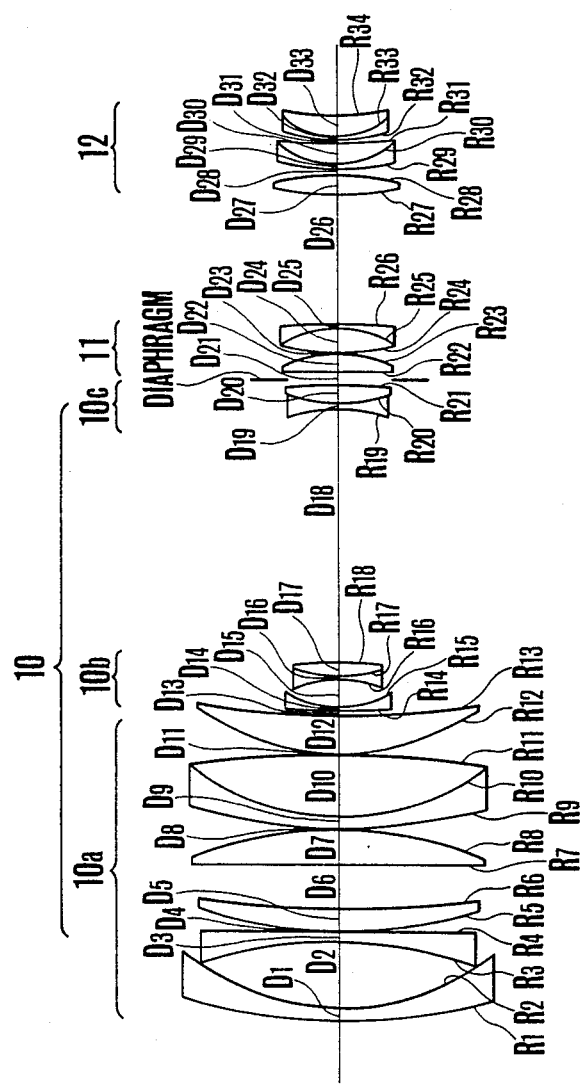
FIG. 14 is a sectional view of a zoom lens of Table 9.
Figures 15A, 15B, 15C:
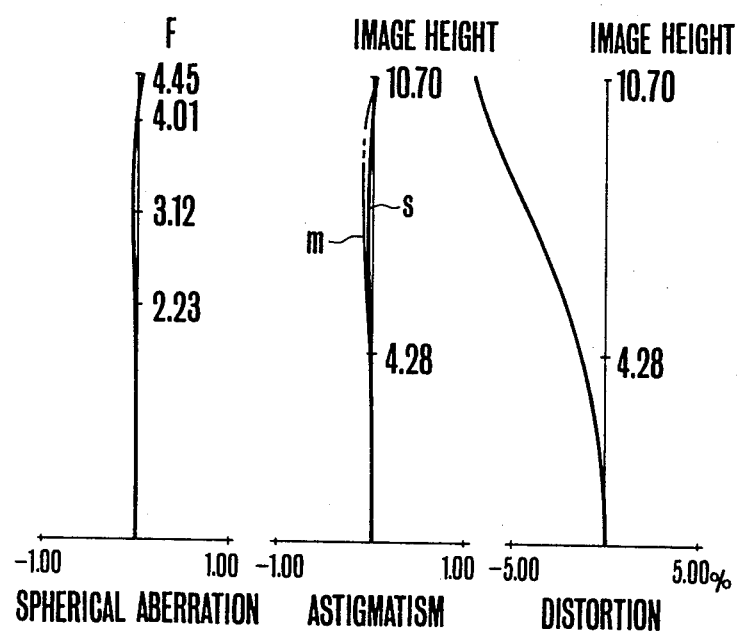
FIGS. 15A to 15F are graphs showing the various aberrations of the zoom lens of FIG. 14 when set at the wide angle end.
Figure 15D:
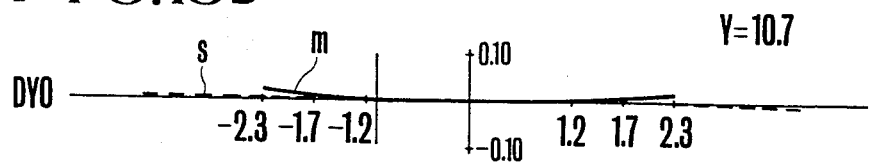
Figure 15E:
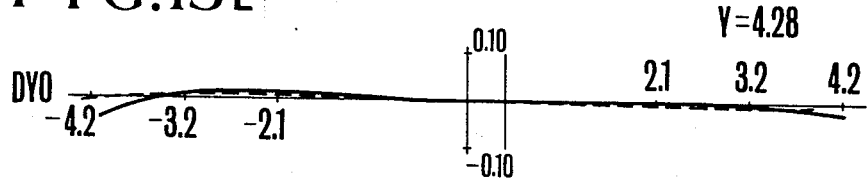
Figure 15F:
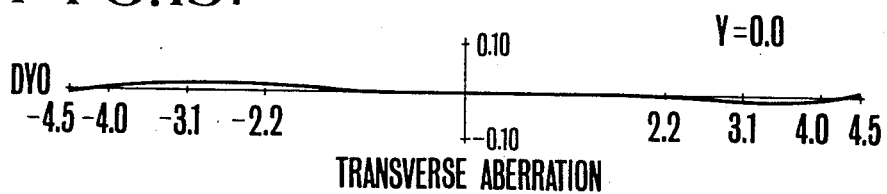
Figures 16A, 16B, 16C:
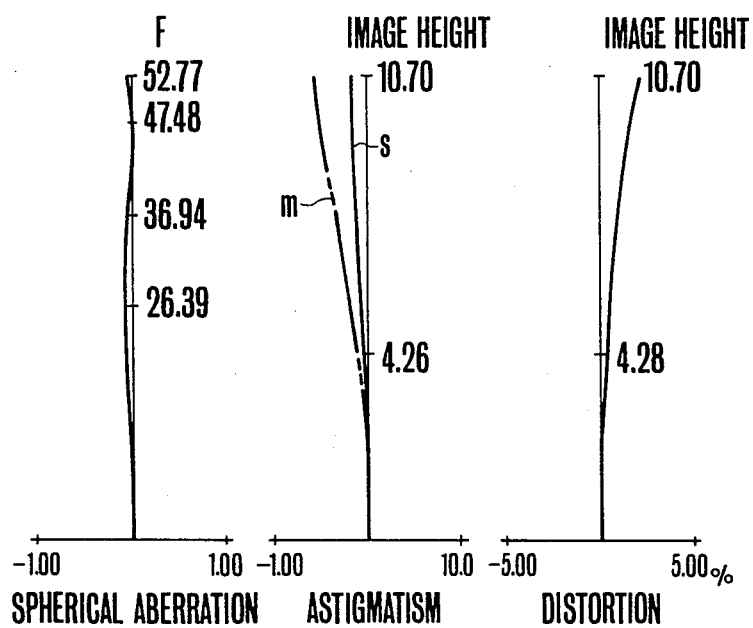
FIGS. 16A to 16F are similar graphs when set at the tele end.
Figure 16D:
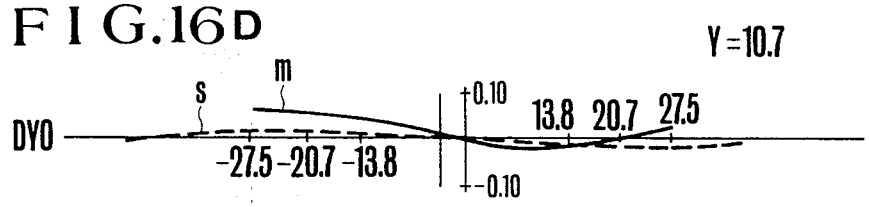
Figure 16E:
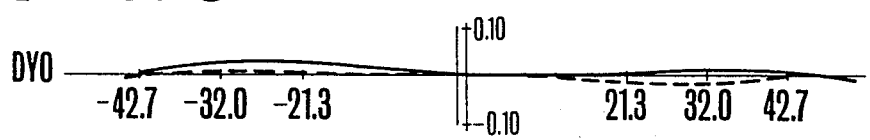
Figure 16F:
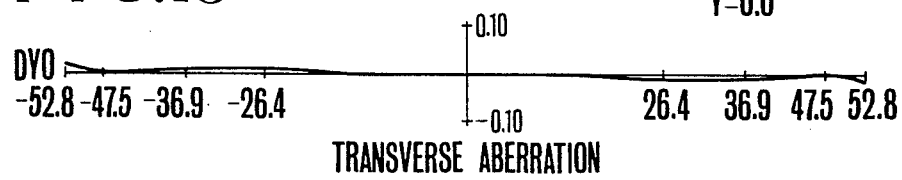

The corresponding lens is shown in FIG. 14 with the front member indicated at 10a. Three lens elements of surfaces R1 to R6 in the front member are axially movable for focusing. FIGS. 15A-15F show the various aberrations in the wide angle positions, and FIGS. 16A-16F show the various aberrations in the telephoto positions.

TABLE 9

Surface

TABLE 9-continued

| No. | R | D | Nd | νd |
|---|---|---|---|---|
| 1 | 245.250 | 5.10 | 1.69680 | 55.50 |
| 2 | 105.570 | 28.72 | | |
| 3 | −190.070 | 4.20 | 1.69680 | 55.50 |
| 4 | 2210.700 | 0.20 | | |
| 5 | 203.740 | 10.12 | 1.69895 | 30.10 |
| 6 | 557.176 | 10.25337 | | |
| 7 | −5852.300 | 14.63 | 1.62041 | 60.30 |
| 8 | −166.670 | 0.30 | | |
| 9 | 256.470 | 4.50 | 1.84666 | 23.90 |
| 10 | 107.350 | 26.34 | 1.62041 | 60.30 |
| 11 | −489.900 | 0.30 | | |
| 12 | 104.180 | 16.51 | 1.62041 | 60.30 |
| 13 | 362.860 | $D_{13}$ | | |
| 14 | 200.010 | 2.00 | 1.80400 | 46.60 |
| 15 | 41.996 | 11.57 | | |
| 16 | −47.853 | 2.00 | 1.80400 | 46.60 |
| 17 | 63.411 | 4.95 | 1.92286 | 21.30 |
| 18 | −309.498 | $D_{18}$ | | |
| 19 | −59.508 | 1.70 | 1.75700 | 47.90 |
| 20 | 65.395 | 7.51 | 1.74077 | 27.80 |
| 21 | −265.930 | $D_{21}$ | | |
| 22 | −2210.700 | 8.02 | 1.51633 | 64.10 |
| 23 | −53.607 | 0.50 | | |
| 24 | 99.262 | 10.78 | 1.48749 | 70.10 |
| 25 | −46.232 | 1.40 | 1.80610 | 40.90 |
| 26 | −206.120 | 54.55 | | |
| 27 | 142.290 | 8.62 | 1.50137 | 56.40 |
| 28 | −100.330 | 2.00 | | |
| 29 | 105.570 | 1.70 | 1.83400 | 37.20 |
| 30 | 39.996 | 10.09 | 1.64000 | 60.10 |
| 31 | 263.870 | 0.30 | | |
| 32 | 61.244 | 2.00 | 1.74950 | 35.30 |
| 33 | 34.731 | 9.51 | 1.50137 | 56.40 |
| 34 | 133.780 | 10.00 | | |

| | $D_{13}$ | $D_{18}$ | $D_{21}$ |
|---|---|---|---|
| Wide Angle | 1.53121 | 108.35377 | 5.0081 |
| Telephoto | 103.9129 | 6.1374 | 4.9428 |

TABLE 10

A 1.5x attachment lens corresponding to FIG. 17.

| Surface No. | r | d | Nd | νd |
|---|---|---|---|---|
| 0 | | 1.0 | | |
| 1 | 67.95 | 5.9 | 1.51633 | 64.1 |
| 2 | 135.01 | 0.5 | | |
| 3 | 46.325 | 1.8 | 1.75520 | 27.5 |
| 4 | 33.773 | 11.68 | 1.48749 | 70.1 |
| 5 | −119.24 | 8.71 | | |
| 6 | −166.67 | 5.02 | 1.72825 | 28.5 |
| 7 | −42.65 | 1.50 | 1.77250 | 49.6 |
| 8 | 47.696 | 18.44 | | |

When this 1.5× attachment lens is used, the various aberrations in the wide angle setting and the telephoto setting become as shown in FIGS. 18A–18F and 19A–19F respectively.

The numerical values of the thin lens separations in the predesign are as follows:

TABLE 11

| Lens Group | 1/φ | e |
|---|---|---|
| 10 | −15.94851 | 61.8632 |
| 11 | 86.07248 | 64.4091 |
| 12 | 90.44543 | |
| | f = 19.153010 | |
| | Sf = 100.87001 | |

With the 1.5× attachment lens:

TABLE 12

| Lens Group | 1/φ | e' |
|---|---|---|
| 10 | −15.94851 | 61.8632 |
| 11 | 86.07248 | −467.7372 |
| 13 | 1048.55267 | 364.3236 |
| 12 | 90.44543 | |
| | f = 28.502932 | m = 1.49 |

TABLE 12-continued

| Lens Group | 1/φ | e' |
|---|---|---|
| | Sf = 100.8835 | ΔE = 167.8182 |

Next, with the entire length remaining almost constant, the magnification is increased. A 2× attachment lens corresponding to FIG. 20.

TABLE 13

| Surface No. | r | d | Nd | νd |
|---|---|---|---|---|
| 0 | | 1.12 | | |
| 1 | 44.832 | 3.45 | 1.48749 | 70.10 |
| 2 | 55.486 | 0.50 | | |
| 3 | 40.135 | 2.20 | 1.80518 | 25.40 |
| 4 | 28.641 | 14.48 | 1.48749 | 70.10 |
| 5 | −119.240 | 4.47 | | |
| 6 | 53.243 | 3.33 | 1.64000 | 60.10 |
| 7 | 71.460 | 11.36 | | |
| 8 | −64.966 | 4.68 | 1.80518 | 25.40 |
| 9 | −25.290 | 1.20 | 1.77250 | 49.60 |
| 10 | 37.632 | 7.76 | | |

When this attachment lens is used, the various aberrations in the wide angle setting are shown in FIGS. 21A–21F, and the various aberrations in the telephoto setting are shown in FIGS. 22A–22F.

Also the numerical values in the thin lens system are as follows:

| Lens Group | 1/φ | e |
|---|---|---|
| 10 | −15.94851 | 61.8632 |
| 11 | 86.07248 | −524.7947 |
| 14 | 572.27967 | 302.1285 |
| 12 | 90.44543 | |
| f = 38.353990 | Sf = 100.88951 | m = 2.0 |

What is claimed is:
1. A lens system with an attachment lens comprising: front optical means having a primary principal plane and a secondary principal plane; an imaging lens group positioned in the rear of said front optical means and consisting of a fixed front sub-group and a fixed rear sub-group in this order; and
an attachment lens inserted into and removable from an air space between said front sub-group and said rear lens group and having a positive power and also having a primary principal plane and a secondary principal plane;
whereby a primary principal plane of said sub-group lies on the image side of the secondary principal plane of said front optical means, and the primary principal plane of said attachment lens lies on the object side of a secondary principal plane of said front sub-group.
2. A lens system according to claim 1, wherein said attachment lens is a Galilean telescopic system.
3. A lens system according to claim 2, wherein said Galilean telescopic system consists of a positive lens group and a negative lens group.
4. A lens system according to claim 3, where said positive lens group consists of a positive lens and a positive doublet lens, and said negative lens group consists of a negative doublet lens.
5. A lens system according to claim 2, wherein said Galilean telescopic system consists of a positive lens group, a positive meniscus lens convex toward the front, and a negative lens group.
6. A lens system according to claim 5, wherein said positive lens group consists of a positive lens and a positive doublet lens, and said negative lens group consists of a negative doublet lens.
7. A lens system according to claim 1, wherein said front optical means has a lens group for focusing and at least two movable groups for zooming.

* * * * *